United States Patent [19]
Muntz et al.

[11] Patent Number: 5,812,618
[45] Date of Patent: Sep. 22, 1998

[54] SRTS CLOCK RECOVERY SYSTEM IMPLEMENTING ADAPTIVE CLOCK RECOVERY TECHNIQUES

[75] Inventors: Gary S. Muntz, Lexington, Mass.; Steven E. Jacobs, Atkinson, N.H.

[73] Assignee: Cisco Technology, Inc., San Jose, Calif.

[21] Appl. No.: 573,302

[22] Filed: Dec. 15, 1995

[51] Int. Cl.⁶ .................................................. H04L 25/36
[52] U.S. Cl. .......................... 375/372; 375/364; 370/519
[58] Field of Search ...................................... 375/354, 362, 375/364, 344, 372; 370/516, 519, 508, 509

[56] References Cited

U.S. PATENT DOCUMENTS

| | | |
|---|---|---|
| 4,961,188 | 10/1990 | Lau . |
| 5,260,978 | 11/1993 | Fleischer et al. . |
| 5,526,362 | 6/1996 | Thompson et al. .................. 370/105.3 |
| 5,608,731 | 3/1997 | Upp et al. ............................... 370/516 |
| 5,694,397 | 12/1997 | Burton .................................... 370/516 |

*Primary Examiner*—Don N. Vo
*Attorney, Agent, or Firm*—Cesari and McKenna, LLP

[57] ABSTRACT

An improved SRTS clock recovery system of a network node comprising a novel adaptifier arrangement that continually monitors the flow of data through a data FIFO and briefly assumes control over the SRTS clock recovery system to permanently adjust the phase and/or temporarily adjust the frequency of a transmit clock to avoid dataflow errors. Specifically, the adaptifier includes a phase controller that permanently adjusts a target phase offset utilized by the SRTS clock recovery system to effect a permanent change in the transmit clock phase. A frequency controller of the adaptifier temporarily overrides an error signal generated by the SRTS clock recovery system prior to it being utilized by a clock generator to effect a temporary adjustment of the transmit clock frequency. Clock perturbations are minimized, including graceful entry and exit of adaptifier action. The adaptifier implements either or both adjustments to avoid an impending dataflow error based upon a number of predetermined conditions. Once such an error is no longer anticipated, control is returned to the SRTS clock recovery system. Advantageously, data FIFO overflow and underflow conditions are prevented, thereby enabling the clock recovery system to provide error-free transmission through the implementing network node. The novel SRTS clock recovery system may make either temporary phase and/or permanent frequency adjustments to the transmit clock to recover from reference clock deviations without loss of data, without causing substantial perturbations in the transmit line frequency, while maintaining interoperability with existing SRTS equipment.

23 Claims, 6 Drawing Sheets

SRTS CLOCK RECOVERY SYSTEM IMPLEMENTING ADAPTIVE CLOCK RECOVERY TECHNIQUES

RELATED APPLICATIONS

The following applications are related to the present application.

U.S. patent application entitled "AN IMPROVED SRTS CLOCK RECOVERY SYSTEM FOR USE IN A HIGHLY STRESSED NETWORK ENVIRONMENT", U.S. Ser. No. 08/573,297, which is now U.S. Pat. No. 5,742,649, naming as inventors Gary S. Muntz and Stanley A. Lackey, Jr., assigned to the assignee of the present invention and filed concurrently herewith.

U.S. patent application entitled "SYSTEM AND METHOD FOR MAINTAINING NETWORK SYNCHRONIZATION UTILIZING DIGITAL PHASE COMPARISON TECHNIQUES WITH SYNCHRONOUS RESIDUAL TIME STAMPS", U.S. Ser. No. 08/573,197, naming as inventors Gary S. Muntz, Steven E. Jacobs, and Guy Fedorkow, assigned to the assignee of the present invention and filed concurrently herewith.

FIELD OF THE INVENTION

The present invention relates generally to network systems, and more specifically, to an improved synchronous residual time stamp (SRTS) clock recovery system for implementation in a network node.

BACKGROUND OF THE INVENTION

An area of network communications that has been evolving since the 1980's is the area of integrated services digital network (ISDN) systems. Since its inception, ISDN has provided a wide variety of services, including voice and data services with bit rates of up to 64 Kbps, integrated within a single network. For voice communications and many text and data applications, the 64 Kbps ISDN rate is sufficient. However, there are increasing demands for broadband communications with substantially higher bit rates such as, for example, high-speed data communications, video, and high resolution graphics communications. Thus, a second generation of ISDN, referred to as broadband ISDN (B-ISDN), has developed to support these latter types of communications while still providing the same advantages of the first generation ISDN.

The first generation ISDN utilizes a synchronous transfer mode wherein, for the duration of a connection, a synchronous channel with constant bit rate (CBR) is allocated to that connection. Although suitable for certain applications, synchronous transfer mode is generally unsuitable for integration of those latter service types which have bit rate requirements above 2 Mps. This has lead to the development of asynchronous transfer mode (ATM) as the preferred method for transferring information in a B-ISDN system. ATM is a method wherein a user's data is partitioned into fixed-length cells for transmission without a specified timing requirement, thereby enabling cell transfer over a synchronous or asynchronous network.

Voice, video, image and high-speed data communications require high-speed transmission capabilities to support associated high-bandwidth requirements; optical transmission systems are especially suitable for this purpose. Accordingly, B-ISDN systems typically employ synchronous optical network (SONET) technology as a transport system. The International Telecommunications Union Telecommunications Standardization Sector (ITU-T, formerly the CCITT) essentially describes a B-ISDN network as a system implemented with ATM and SONET technologies built on the concepts of the ISDN model.

Figure 1:
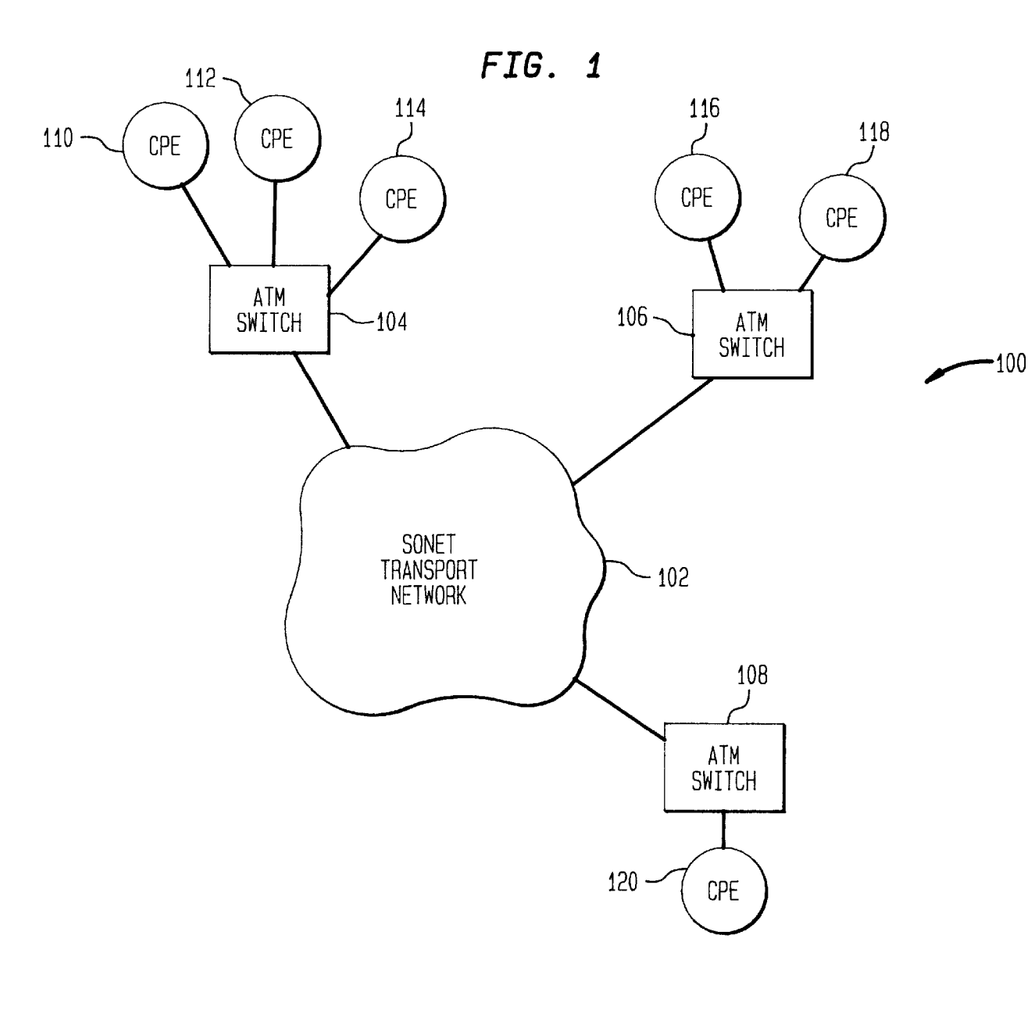
FIG. 1 is a high level block diagram of a typical broadband integrated services digital network (BISDN)

FIG. 1 is a block diagram of an exemplary B-ISDN network. Network 100 includes a SONET physical carrier transport system 102 for transporting data between ATM switches 104, 106 and 108. ATM switches 104–108 provide a network interface for a user's customer premises equipment (CPE), such as a PBX or local computer. In the exemplary network of FIG. 1, ATM switch 104 couples CPEs 110, 112, and 114 with network 102, while ATM switches 106 and 108 connect CPEs 116, 118 and 120, respectively, to that network. The function and operation of ATM switches 104–108, also referred to as ATM nodes, are described further herein.

Figure 2:
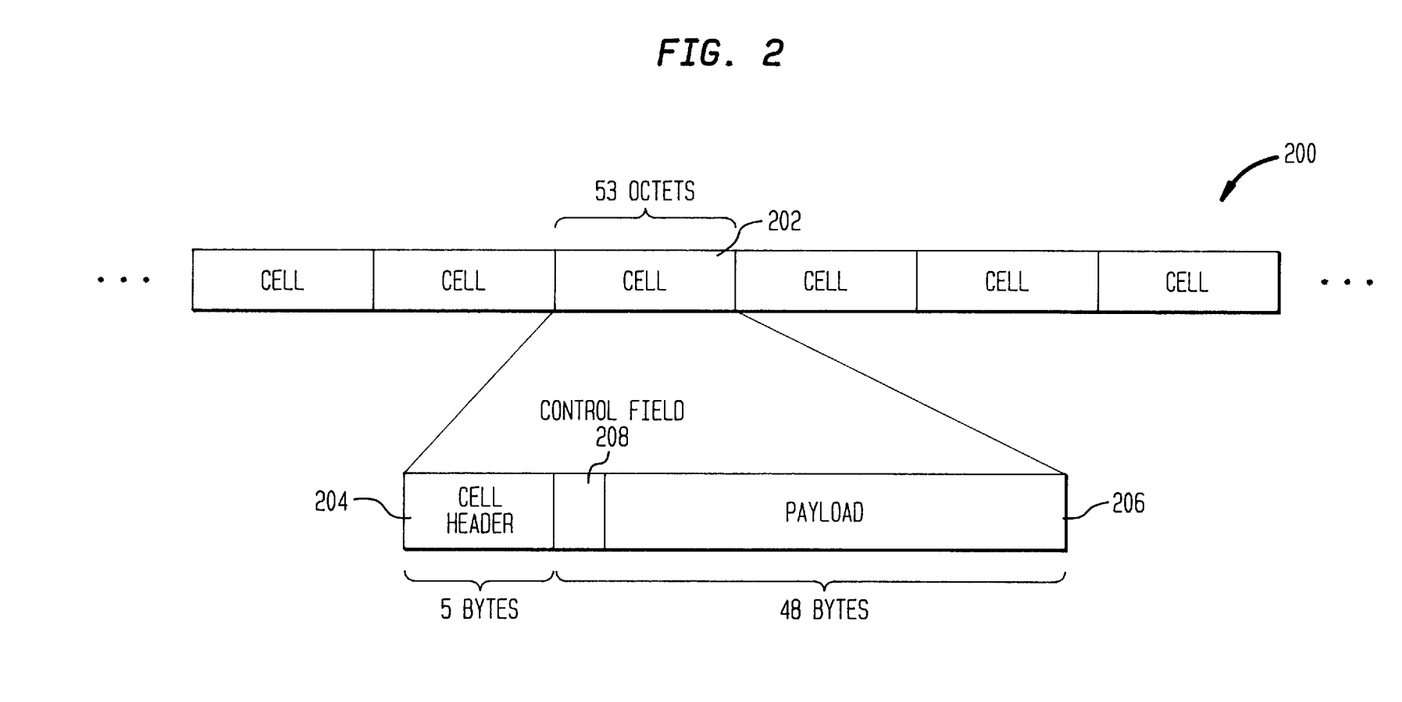
FIG. 2 is a block diagram of an ATM cell transmission, illustrating the fields of an individual ATM cell.

In contrast to the circuit switching orientation of the first generation ISDN, B-ISDN has a cell relay or packet-switching orientation. FIG. 2 illustrates a format of a cell-based transmission 200 generated by an ATM switch such as switch 104. Cell-based transmission 200 includes a plurality of cells 202, each of which has a size of 53 bytes, including a 5-byte header 204 and a 48-byte payload 206 of user data. Header 204 is generally used for achieving transmission over network 100 and, to that end, includes information pertaining to such functions as routing and traffic control. Segmentation of the data into cells results in an integrated approach to networking, providing flexibility for handling different types of information such as voice, data, image and video over a single transmission facility 102.

One of the many types of services which can be supplied by network 100 is a circuit emulation service, wherein user data flows through the network at a constant bit rate (CBR). This service typically uses ATM Adaptation Layer 1 (AAL1), which is specifically designed for CBR applications. Control information required for these operations is included in a control field 208. In the illustrative embodiment, control field 208 is a 1-byte field located in the 48-byte payload 206 dedicated to user data in each cell 202. Bits in successive control fields can optionally be used to convey a Residual Time Stamp (RTS), used in applications employing SRTS clock recovery. Depending on the implementation, source CPE 110 may provide AAL1 segmentation and reassembly, or those functions may be provided by source ATM switch 104.

Timing variations inevitably exist among the network components. High frequency variations, referred to as jitter, are typically reduced to manageable levels through the use of jitter filters in each node. Low frequency variations, referred to as wander, are typically dealt with in a network through the use of buffers located within the nodes of the network. Specifically, these buffers store a small amount of data, allowing it to build up or be drained by a small magnitude wander without data loss or errors. When wander exceeds the capacity of the buffers they either repeat (i.e., underflow) or discard (i.e., overflow) blocks of data to compensate for differences in timing between the source and destination nodes. Underflow and overflow operations, generally referred to as slip, typically result in errors within the network. For example, in a voice circuit, slip may be detected by popping or clicking sounds, whereas in data transmissions, slip is manifested in the loss of data. Very large buffers can reduce the probability of such errors, but they increase the delay through the network. Delay is undesirable, so buffer size is minimized.

Various clock recovery techniques have been developed to maintain network synchronization to avoid such loss of data. A technique commonly used in BISDN systems implementing ATM is the synchronous residual time stamp (SRTS) clock recovery method. One conventional SRTS clock recovery method is described in U.S. Pat. No. 5,260,978 to Fleischer et al., (hereinafter "Fleischer").

The SRTS clock recovery technique discussed in that patent carries timing information, in the form of a residual time stamp (RTS), through the network along with the data transmission. The SRTS clock recovery system residing in the destination node uses the timing information to recover the frequency of the source node clock and to generate a transmit clock of the same frequency, at which the destination node transmits the data to a destination user process.

At the source node, an RTS sample is generated representing the frequency difference between the source node clock and the network reference clock. Once the RTS sample is conveyed to a destination node with a data transmission, the destination node attempts to produce a similar destination transmit clock frequency by generating a local RTS sample and comparing it to the received RTS sample. The difference between the two RTS values is utilized to directly control an oscillator generating the transmit clock. A feedback loop is provided to enable the above process to be repeated until the transmit clock frequency matches the source node clock frequency.

The term "residual" stems from the fact that this technique actually sends a value representing the residual part of the frequency difference information. This approach is based on the assumption that the nominal part of the derived reference clock is known at the source and destination nodes due to the common availability of the network reference clock. A 4 bit RTS sample has been established as the standard by the International Telecommunications Union (ITU) to transmit the residual frequency difference information while consuming a minimal amount of bandwidth. The local RTS sample generated by the SRTS clock recovery system located in the destination node is also 4 bits in length for proper comparison to the received RTS sample as noted above.

A drawback to conventional SRTS clock recovery systems similar to that disclosed in Fleischer is that it is based upon the assumption that identical network reference clocks are provided to the source and destination nodes. This is often not the case because each portion of the network may be synchronized to a different reference clock creating multiple timing domains. Although these local clocks may be referenced to stratum 1 clocks, they may exhibit a phase departure over time that continues to increase until a slip occurs.

Moreover, if a network element such as a digital cross connect fails, certain network nodes may lose their reference clock. These nodes must then utilize their internal clocks, resulting in an increased loss of data due to the difference in phase and frequency between the node's internal and reference clocks. The resulting phase departure further manifests itself as noted: clicking and popping noises in voice transmissions and data loss in image and video transmissions. Clearly, these conventional SRTS clock recovery techniques are only as reliable as the consistency of the reference clocks utilized by the source and destination nodes.

What is needed, therefore, is a clock recovery system than can recover from such reference clock deviations without loss of data and without causing perturbations in the transmit line frequency while retaining features of SRTS, including interoperability with existing SRTS equipment.

SUMMARY OF THE INVENTION

The present invention is an improved SRTS clock recovery system of a network node comprising a novel circuit arrangement (hereinafter referred to as "adaptifier") that continually monitors the flow of data through a data FIFO and briefly assumes control over the SRTS clock recovery system to permanently adjust the phase and/or temporarily adjust the frequency of a transmit clock to avoid dataflow errors.

Specifically, the novel adaptifier arrangement includes a phase controller that permanently adjusts a target phase value utilized by the SRTS clock recovery system to effect a permanent change in the transmit clock phase. A frequency controller of the adaptifier temporarily overrides an error signal generated by the SRTS clock recovery system prior to it being utilized by a clock generator to effect a temporary adjustment of the transmit clock frequency. In the illustrative embodiment, the adaptifier implements either or both corrective measures to avoid an impending dataflow error based upon a number of predetermined conditions. Once such an error is no longer anticipated, control is returned to the normal mode of operation in the SRTS clock recovery system.

More specifically, the phase controller permanently adjusts the current target phase value by replacing it with a new target phase value to prevent the occurrence of the anticipated dataflow error. A phase adjuster of the phase controller determines the new target phase value by adjusting the current target phase value in response to various factors.

In contrast, the frequency controller temporarily adjusts the current frequency control value provided to the clock generator by ignoring the update signal and instead modifying the contents of a frequency control register. A frequency adjuster portion of the controller determines the new control value by incrementing or decrementing the current frequency control value by a predetermined amount in response to signals in the adaptifier module. During normal operation, the frequency control value is the current output of a low-pass filter. To effect a temporary adjustment to the transmit clock frequency, this controller increments or decrements the value in the frequency control register and passes the result to the clock generator.

In addition, the clock recovery system includes a network receiver for receiving and processing an information stream received from the source node. The network receiver includes a cell/packet receiver that receives and parses the received information stream into an RTS sample and data portion. The data portion is loaded in the data FIFO and the RTS sample portion is loaded in a RTS FIFO, both at the rate they are processed. The data FIFO has two markers for indicating when the FIFO is almost full and almost empty.

In addition, the SRTS clock recovery subsystem includes an RTS sample generator for generating a local RTS sample to be subtracted from the source RTS sample stored in the RTS FIFO to determine a current phase offset between the source and transmit clocks. The current phase offset is provided to the adaptifier arrangement for determining the target phase value. The current RTS phase offset is subtracted from the target RTS phase offset to generate a phase error signal.

A clock generator adjusts the frequency of the transmit clock in response to the phase error signal generated by the SRTS clock recovery subsystem and adjusted by the adaptifier, and transmits the source data to the destination CPE at the adjusted transmit clock frequency. Significantly, the clock generation stage includes a low pass filter for filtering the control signal prior to providing it to a numerically controlled oscillator (NCO) that generates the transmit clock.

Advantageously, the improved SRTS clock recovery system of the present invention prevents data FIFO overflow or underflow conditions from arising, thereby enabling the clock recovery system to provide error-free transmission through the implementing network node. A significant feature of the clock recovery system is its anticipatory nature, enabling it to perform error correction functions before data is lost. Another feature provided by the novel SRTS clock recovery system is the ability to make either temporary frequency and/or permanent phase adjustments to the transmit clock to recover from reference clock deviations without loss of data and without causing substantial perturbations in the transmit line frequency. Significantly, the SRTS clock recovery system retains all other SRTS features. Particularly, the present invention maintains interoperability with existing SRTS equipment.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identifies the drawing in which the reference number first appears.

BRIEF DESCRIPTION OF THE DRAWINGS

For a fuller understanding of the nature of the invention, reference should be had to the following detailed description taken in connection with the accompanying drawings, in which.

DETAILED DESCRIPTION OF THE PREFERRED EMBODIMENTS

A. System Environment

Figure 3:
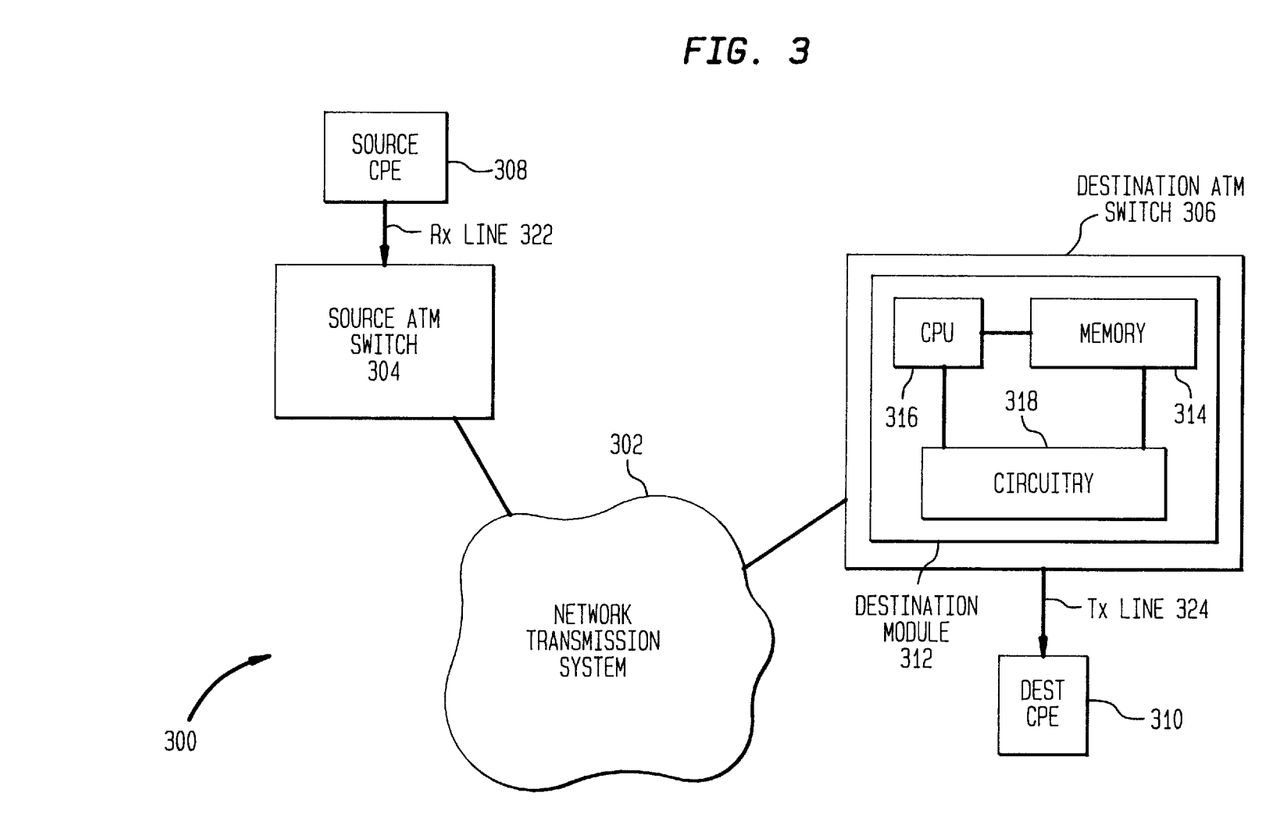
FIG. 3 is a high level block diagram of a BISDN system implementing the source and destination nodes of the present invention.

FIG. 3 is a block diagram of a network system 300 wherein the preferred embodiments of the present invention are implemented. Network system 300 comprises a plurality of nodes, some of which interface customer premises equipment (CPE) to the network. The nodes include a source node 304, a destination node 306, and a plurality of other nodes not shown.

Generally, source node 304 receives user information from source CPE 308 via receive line 322 for transmission over network transmission system 302 to destination CPE 310. Source node 304 processes the information for proper transmission over network 302 and then transfers that information to destination node 306 as a network transmission through network system 302. Destination node 306 receives and processes the network transmission, providing the user information to destination CPE 310 via transmit line 324.

The source CPE provides the source node with a transmit signal that includes the source information and a receive line clock. In the illustrative embodiment, receive line clock is a T1 line clock signal operating at 1.544 MHz. In alternate embodiments the receive clock signal may be an E1 clock signal, operating at 2.048 MHz. However, as would be apparent to one skilled in the relevant art, the receive clock may be any clock frequency associated with network 300.

In the illustrative embodiment, network transmission system 302 may have one or more network reference clocks, at least one of which is made available to both source node 304 and destination node 306. In such an embodiment, source node 304 may also generate an RTS sample. The RTS sample is a standard 4 bit value representing the phase offset between the network reference clock and the receive clock provided to the source node. The source node combines the RTS sample with the data and places them in the necessary format appropriate for the type of network 302. In the preferred embodiment wherein source node 304 is an ATM switch, the 4 bit RTS sample is placed in alternating successive control fields 208 of cells 202. However, as would be apparent to one skilled in the relevant art, the RTS sample information may be transmitted in any form consistent with the type of network 300. Furthermore, the phase offset information may be represented by forms other than an RTS sample.

Destination node 306 comprises a destination module 312 of the present invention and a number of other components not shown. Destination module 312 includes a number of interoperable elements, including a central processing unit (CPU) 316, a memory unit 314, and circuitry 318. Destination module 312 may be configured to perform an improved SRTS clock recovery technique described below. In the preferred embodiment of the present invention, a large portion of destination module 312 is implemented in an application specific integrated circuit (ASIC). However, as would be apparent to those skilled in the relevant art, destination module 312 may be implemented in any manner appropriate for a particular application. Furthermore, in the preferred embodiment of the present invention, network system 300 is a B-ISDN network system. Accordingly, source and destination nodes 304, 306 are preferably ATM switches and network transportation system 302 is a SONET system. However, as one skilled in the relevant art would find apparent, the invention may be implemented in any network system.

B. Destination Module

Figure 4:
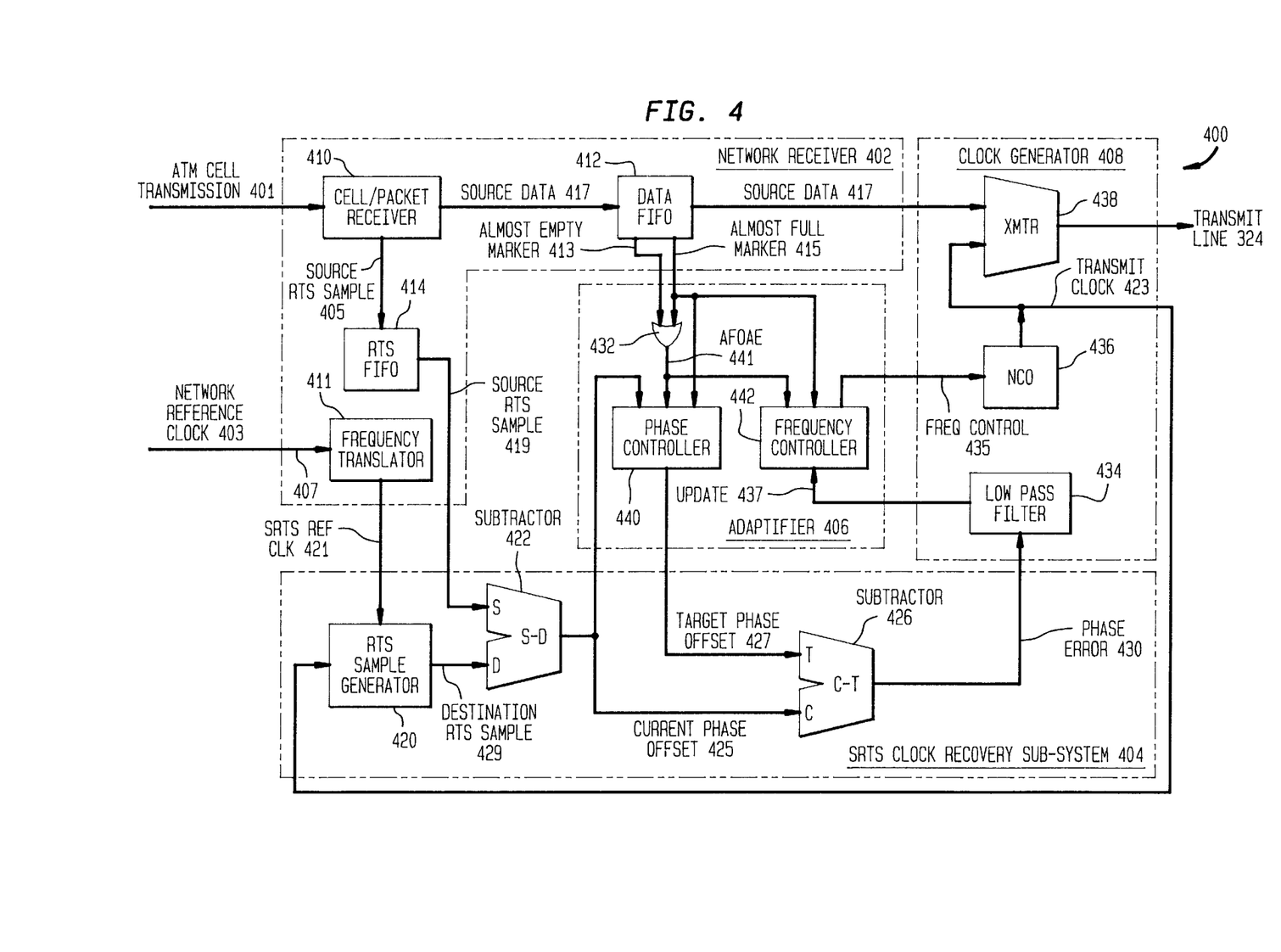
FIG. 4 is a schematic block diagram of the preferred embodiment of the improved SRTS clock recovery system of the present invention.

The present invention is an improved SRTS clock recovery system of a network node implemented in destination module 312 for ensuring proper reception and transmission of information over a network having a system reference clock. FIG. 4 is a schematic functional block diagram of the preferred embodiment of the SRTS clock recovery system of the present invention. Clock recovery system 400 includes a network receiver 402, an SRTS clock recovery subsystem 404, an adaptifier 406, and a clock generator 408.

Network receiver 402 is configured to receive and process information streams received by network destination ATM switch 306. In the illustrative embodiment, the information stream is configured as ATM cell transmissions 401. Network receiver 402 also receives a network reference clock 403, illustrated in FIG. 4 as being provided to SRTS clock recovery system 400 via a clock input line 407.

Network receiver 402 includes a cell/packet receiver 410 for receiving the information stream, data and RTS FIFOs 412 and 414 for storing respective portions of the information stream, and a frequency translator 411 for receiving and converting network reference clock 403.

Upon receipt of an ATM cell transmission 401 containing an RTS sample, cell/packet receiver 410 parses the incoming ATM cell transmission into a source residual time stamp (RTS) portion 405 and a source data portion 417. Since network traffic typically results in a burst of incoming cells followed by a period of no activity, the incoming information is loaded into FIFOs to enable the node to transmit the received bursts of data at an independent transmission rate appropriate for destination CPE 310. Thus, after separating source RTS sample 405 and source data 417, cell/packet receiver 410 loads the source data into data FIFO 412 and loads the source RTS sample into RTS FIFO 414. Once loaded in the data and RTS FIFOs, the source data and RTS sample are thereafter available to clock generator 408 and SRTS clock recovery subsystem 404, respectively.

Data FIFO 412 generates an almost empty marker 413 and an almost full marker 415. Almost empty marker 413 indicates when the level in the data FIFO decreases past an associated lower level threshold. Similarly, almost full marker 415 indicates when the data level in the data FIFO increases past an associated upper level threshold. When the level of data in the data FIFO is at or below the lower level threshold, almost empty marker 413 is active whereas when the data level is at or above the upper level threshold, almost full marker 415 is active. Alternatively, when the data level is above the lower level threshold and below the upper level threshold, the almost empty and the almost full markers are both inactive.

Network reference clock 403 is processed by frequency translator 411 to generate an SRTS reference clock 421. In the exemplary embodiment, network reference clock 403 is the T1 clock rate of 1.544 MHz. Frequency translator 411 generates a 2.43 MHz SRTS reference clock 421 based the 1.544 MHz network reference clock 403. In other preferred embodiments, the network reference clock and/or the SRTS reference clock may have other frequencies. In the preferred embodiment of the present invention, frequency translator 411 is implemented with a phase lock loop (PLL), the function and operation of which is considered to be well known to those skilled in the relevant art. However, as would be apparent to one skilled in the art, frequency translator 411 may utilize other translation methods to create a suitable SRTS reference clock 421 from network reference clock 403. It should be noted, however, that a PLL is preferred due to its ability to control jitter and phase transients in the reference clock distribution system.

SRTS clock recovery subsystem 404 maintains a constant phase offset between the receive clock of the source node and the transmit clock of the destination node. The SRTS clock recovery subsystem includes an RTS sample generator 420 for generating a destination RTS sample 429. It also comprises a subtractor 422 for determining the difference between this destination RTS sample and the source RTS portion of the information stream, generating a current phase offset 425 between the source and destination clocks. The difference between the current phase offset and a previously determined target phase offset 427 is then determined at a subtractor 426 and provided to the clock generator as an error signal 430.

RTS sample generator 420 generates a destination RTS sample 429 based upon SRTS reference clock 421 and transmit clock 423. Destination RTS sample 429 represents the phase offset between the SRTS reference clock 421 and transmit clock 423. As would be apparent to one skilled in the relevant art, RTS sample generator 420 may be implemented in any manner sufficient to generate an appropriate RTS sample for comparison with source RTS sample 419. Furthermore, the function and operation of RTS sample generator 420 is considered to be well known to those skilled in the relevant art.

Source RTS sample 419 is transferred from RTS FIFO 414 to a source input of subtractor 422 while destination RTS sample 429 is transferred from RTS sample generator 420 to a destination input of subtractor 422. Subtractor 422 subtracts destination RTS sample 429 from source RTS sample 419 to determine a current phase offset 425 between the source and destination clocks.

The difference between the current phase offset 425 and a target phase offset 427 generated by the adaptifier 406 (discussed below) is determined by providing the target phase offset to the target input while the current RTS phase offset is provided to a current input of the subtractor 426. Subtractor 426 then determines the difference between the current and target phase offsets, generating a phase error 430 for use by the clock generator.

Clock generator 408 generates transmit clock 423 having a frequency at which the source data is transmitted to destination CPE 310. Clock generator 408 adjusts the frequency of the transmit clock in accordance with the phase error between the receive clock of the source node and the transmit clock of the destination node. The clock generator includes a low pass filter 434 for filtering the phase error signal, a numerically controlled oscillator (NCO) 436 for generating transmit clock 423 based upon a frequency control signal 435 generated by low pass filter 434 and modified by adaptifier 406 (discussed below). The clock generator also comprises a transmitter 438 for transmitting the source data at the frequency of the transmit clock generated by the NCO 436.

Upon receipt of phase error 430 by clock generator 408, the phase error is filtered by low pass filter 434. In the preferred embodiment of the present invention low pass filter 434 employs a digital low pass filter configured to remove high frequency components from the RTS phase error signal 430. However, as one skilled in the art would find apparent, the low pass filter may be implemented digitally, in analog, or with a combination of digital and analog elements. It should be noted, however, that digitally filtering the phase error enables the present invention to filter a large frequency range of error signal, including low frequency signals not easily addressed by analog filters. The function and operation of low pass filter 434 is considered to be well known to those skilled in the relevant art.

NCO 436 determines the frequency of transmit clock 423 based upon the value of frequency control signal 435 generated by adaptifier 406 (discussed below). NCO 436 provides transmit clock 423 to transmitter 438. As noted, source data 417 was previously loaded into data FIFO 412. The source data is retrieved by transmitter 438 for transmission over transmit line 324 to destination CPE 310 at the rate of transmit clock 423. It is considered to be apparent to those skilled in the art that NCO 436 may be any commonly known NCO or other type of variable oscillator now or later developed and that the NCO may be implemented in digital, analog, or a combination of digital and analog elements. For example, a phase lock loop (PLL) may be used in conjunction with additional circuitry. It should be noted however, that the preferred digital implementation is desirable over the analog implementation due to its increased stability with respect to voltage, temperature, and aging of the circuit. Furthermore, in the preferred ASIC implementation of the destination module, an all-digital NCO is considerably less costly and more efficient to manufacture.

The adaptifier 406 monitors the performance of the SRTS clock recovery subsystem 404 by continually receiving an indication of the level of data in data FIFO 412. Based upon various factors described below, the adaptifier permanently adjusts the phase and/or temporarily adjusts the frequency of transmit clock 423 to avoid an impending dataflow error from occurring.

The level of data FIFO 412 is provided to the adaptifier in the form of almost empty marker 413 and almost full marker 415. These two signals are provided to an "OR" gate 432 that generates an "almost full or almost empty" (AFOAE) signal 441 that is provided to both a phase controller 440 and a frequency controller 442. Almost full marker 415 is also directly provided to controllers 440,442.

Due to the bursty nature of ATM cell transmission 401, the level of data in data FIFO 412 varies, with the average level of the FIFO being approximately half full. The threshold levels of data FIFO 412 at which markers 413 and 415 are located are determined based upon a number of factors, one of which is the cell delay variation (CDV) anticipated on the network. An anticipated cell delay variation may be determined based upon the known CDV parameters for the attached network equipment. In the absence of known network parameters, default values may be chosen.

During normal network operations the data FIFO level is within the region bounded by almost empty and almost full markers 413, 415. However, if the data level of data FIFO 412 traverses either of these thresholds, an error condition is raised in anticipation that the data level will continue increasing/decreasing until a data overflow/underflow condition occurs. The error condition signifies that the source and transmit clock frequencies have drifted due to any number of factors, such as the reference clocks utilized by the source and destination nodes have drifted or failed.

Accordingly, if the data level of data FIFO 412 ever reaches either the "almost full" or "almost empty" threshold, adaptifier 406 is invoked to adjust the phase and/or frequency of the transmit clock to compensate for the reference clock error. Specifically, if the "almost empty" threshold is traversed, it is inferred that the transmit clock is running faster than the source node clock because bits are being transmitted to destination CPE 310 faster than they are being received from source ATM switch 304. Conversely, if the "almost full" threshold is traversed, it is inferred that the transmit clock is running slower than the source node clock. In either case, the novel adaptifier includes a phase controller 440 that permanently adjusts a target phase offset utilized by the SRTS clock recovery system to effect a permanent change in the transmit clock phase. A frequency controller 442 of the adaptifier temporarily overrides the filtered error signal 437 generated by the SRTS clock recovery system and clock generator, prior to it being utilized by the clock generator to effect a temporary adjustment of the transmit clock frequency. The adaptifier implements either or both of these adjustments to avoid an impending dataflow error. Once such an error is no longer anticipated, control is returned to the normal mode of the SRTS clock recovery system.

Figure 5:
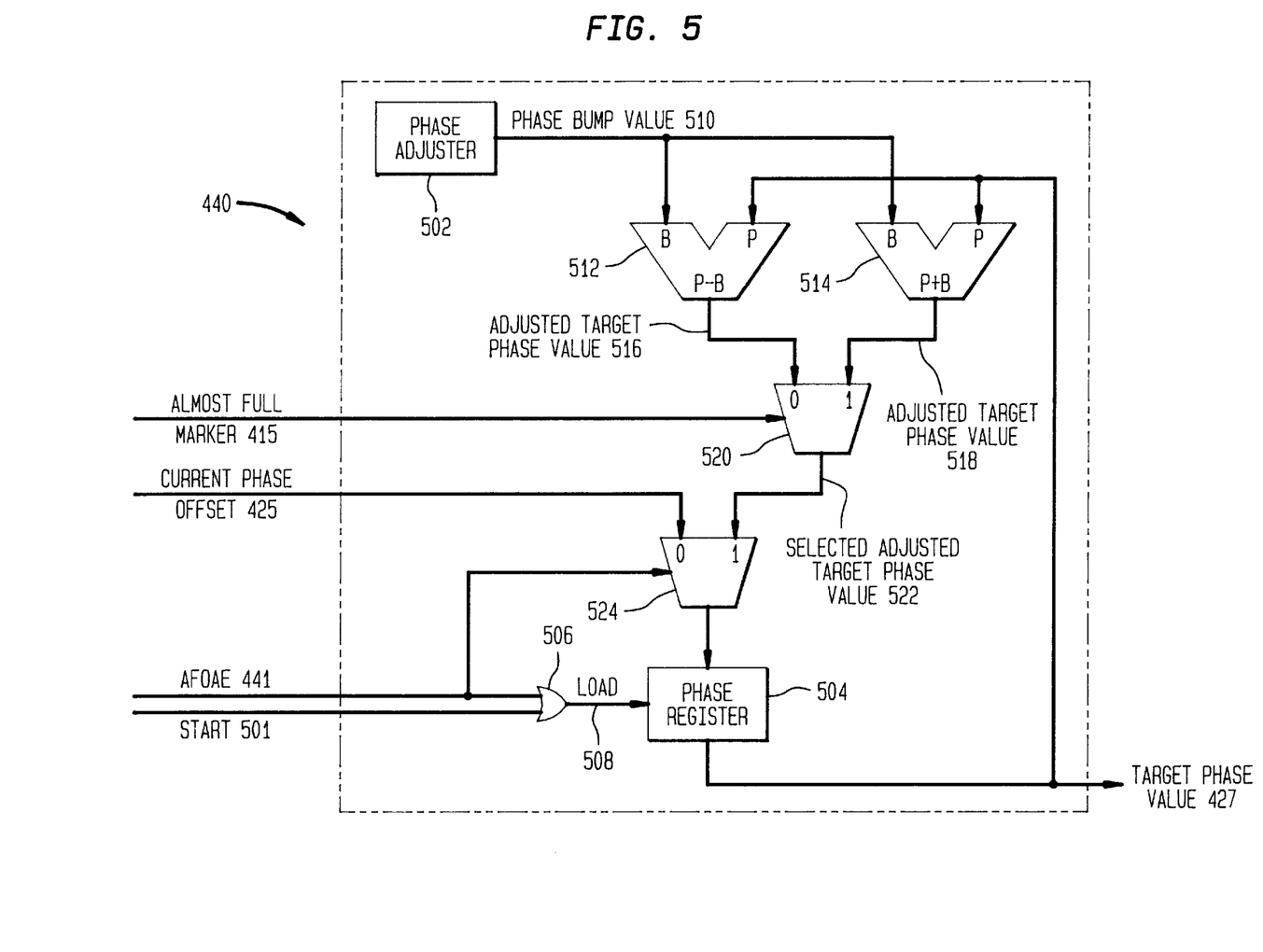
FIG. 5 is a functional block diagram of the phase controller of the adaptifier of the present invention.

Referring to FIG. 5, phase controller 440 includes a phase adjuster 502, phase register 504, and a series of adders, subtractors, and selectors configured to adjust target phase value offset 427. Generally, phase adjuster 502 determines a predetermined constant phase bump value 510 that is provided to a bump input of subtractor 512 and adder 514. The current target phase value 427 is provided to the present inputs of subtractor 512 and adder 514. Subtractor 512 subtracts the phase bump value from the current target phase value to result in an adjusted target phase value 516 that is provided to the "0" input of selector 520. Adder 514 adds the phase bump value to the current target phase value to result in an adjusted target phase value 518 that is provided to the "1" input of selector 520.

Selector 520 is controlled by almost full marker 415. When almost full marker 415 is active, the adjusted target phase value 518 is chosen as the selected adjusted target phase value 522. Otherwise, the adjusted target phase value 516 is chosen when the almost full marker is not active. The selected adjusted target phase value 522 is provided to the "1" input of selector 524. Current phase offset 425 is provided to the "0" input of selector 524. Selector 524 is controlled by the state of the almost full or almost empty (AFOAE) signal 441. When the AFOAE signal is active, then the selected adjusted target phase value 522 is provided to phase register 504. Conversely, when AFOAE 441 is inactive, the current phase offset 425 is provided to phase register 504.

AFOAE signal 441 and a start signal 501 are provided to an "OR" gate 506. The "OR" gate 506 generates a load signal 508 when either AFOAE 441 or start signal 501 are true, causing phase register 504 to load whichever phase value is presented to it by selector 524, which is then referred to as the current target phase value.

When the destination module begins operation, the current RTS phase offset 425 initially generated by subtractor 422 is referred to as an initial RTS phase offset. The initial source-destination phase offset represents the phase offset between the source and destination at the moment the constant bit rate circuit is established. This phase offset must be preserved to guarantee a constant bit rate service between the source and destination nodes of the network, while minimizing phase transients on transmit line 324. Therefore, the initial RTS phase offset is a target phase offset that is to be maintained as long as the circuit is in use. Since some RTS sample generators produce an erroneous RTS sample immediately following initialization, the second source RTS sample received by the SRTS destination module is considered to be the first reliable, and thus the initial, RTS sample. Thus, the phase offset 425 produced from the second source RTS sample is loaded into phase register 504.

When the first reliable RTS value is generated by the source node, start signal 501 is active. AFOAE signal 441 is inactive, indicating that no error condition has yet occurred in the system. OR gate 506 generates load signal 508 causing phase register 504 to load the current RTS phase offset 425 which, as indicated above, is considered to be the initial RTS phase offset. This value is then output by adaptifier 406 as target phase value 427 for use by the SRTS cock recovery subsystem.

During normal operations, phase controller 440 does not change the contents of phase register 504, thereby providing the SRTS clock recovery subsystem with a constant target phase value 427. However, when an impending dataflow error condition arises, phase controller 440 is activated to permanently adjust the phase of the transmit clock. As noted, an impending dataflow error is indicated by either the almost empty marker 413 or the almost full marker 415 being active to indicate the respective condition. Since either of the two signals activates the adaptifier, an OR gate 432 is provided to generate a single signal to indicate that one of the two conditions has occurred. When AFOAE signal 441 is active, OR gate 506 generates load signal 508 causing phase register 504 to load the value presented by selector 524.

However, the activation of AFOAE signal 441 causes selector 524 to present the selected adjusted target phase value 522 to phase register 504. The state of AFOAE is evaluated once per iteration of the SRTS clock recovery subsystem 404: once per RTS sample interval. Therefore, a sustained interval when the FIFO depth is past a marker will result in repeated small changes to phase register 504.

As noted, the selected adjusted target phase value 522 is determined by selector 520 which is controlled by almost full marker 415. When the data FIFO level traverses the almost full threshold, almost full marker 415 is active, causing selector 520 to select adjusted target phase value 518, adding phase bump value 510 to the current target phase value 427. Conversely, when the data FIFO level traverses the almost empty threshold, almost full marker 415 is not active, causing selector 520 to select adjusted target phase value 516, subtracting phase bump value 510 from the current target phase value 427. In either case, this causes the SRTS clock recovery subsystem to seek a shifted phase which in turn causes the clock generator to decelerate/accelerate the transmit clock. Once the error condition has been rectified, the selected adjusted target phase value 427 loaded into phase register 504 is not further altered, becoming a permanent target phase value in future operations.

Phase error 430 is an indication of how many reference clock "units" transmit clock 423 is out of synchronization with the desired transmit clock phase. The unit of phase is a single reference clock tick at the SRTS reference clock frequency of 2.43 MHz. Thus, each increment of the integer value of phase bump value 510 increases the target phase value 427 by 1 reference clock tick each time AFOAE is activated. Phase bump value 510 is predetermined by phase adjuster 440 based upon a number of factors, including the worst anticipated frequency mismatch and time required by the destination module to fully recover.

When the FIFO depth is near an extreme, the phase controller repeatedly increments the target phase value by the phase bump value to gradually effect a change in the phase of the transmit clock. The increments must be small, and since the phase bump value is an integer, typically a value of 1. This is because large changes in the target phase value cause wander to develop in the destination module. Wander results from the SRTS clock recovery subsystem perceiving that the reference clock has moved the number of RTS samples equal to the phase bump value 510. Thus, if the phase bump value is set to, e.g., 5, then the SRTS clock recovery subsystem 404 generates a phase error 430 indicating a reference clock change equivalent to 5 RTS sample values. This large correction factor causes transmit clock 423 to generate wander. Thus, phase bump value 510 must be large enough to converge the phases of the transmit clock and source node clock, but otherwise as small as possible to minimize wander.

Figure 6:
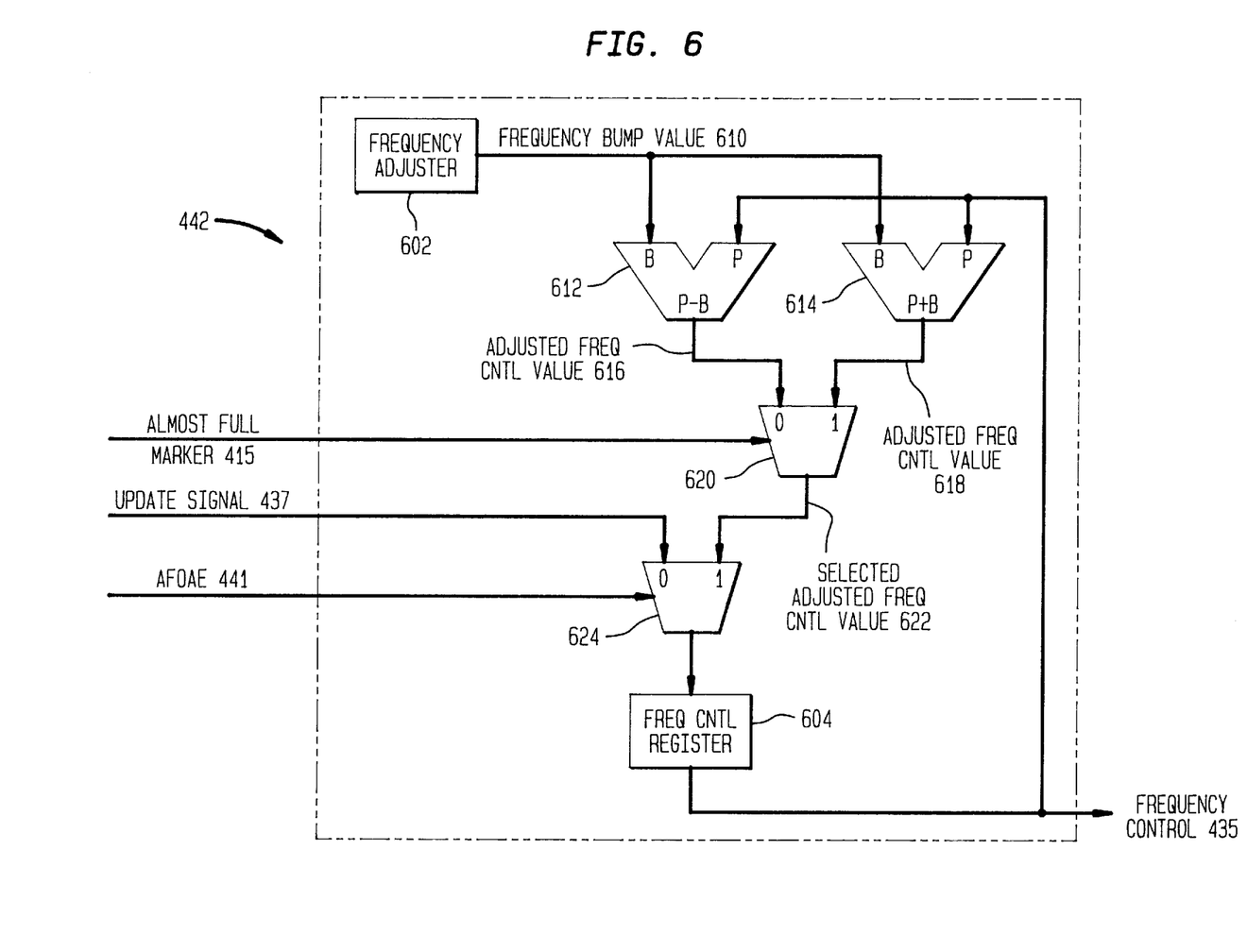
FIG. 6 is a functional block diagram of the frequency controller of the adaptifier of the present invention.

Referring to FIG. 6, frequency controller 442 includes a frequency adjuster 602, frequency control register 604, and a number of adders, subtractors, and selectors configured to adjust frequency control value 435. Generally, frequency adjuster 602 determines a predetermined constant frequency bump value 610 that is provided to a bump input of subtractor 612 and adder 614. The current frequency control value 435 is provided to the present inputs of subtractor 612 and adder 614. Subtractor 612 subtracts the frequency bump value from the current frequency control value to result in an adjusted frequency control value 616 that is provided to the "0" input of selector 620. Adder 614 adds the frequency bump value to the current frequency control value to result in an adjusted frequency control value 618 that is provided to the "1" input of selector 620.

Selector 620 is controlled by almost full marker 415. When almost full marker 415 is active, the adjusted target frequency value 618 is chosen as the selected adjusted target frequency value 622. Otherwise, the adjusted target frequency value 618 is chosen.

The selected adjusted frequency control value 622 is provided to the "1" input of selector 624 while update signal 437 is provided to the "0" input of selector 624. Selector 624 is controlled by the state of the AFOAE signal 441. When the AFOAE signal is active, the selected adjusted frequency control value 622 is provided to frequency control register 604. Conversely, when AFOAE 441 is inactive, the update signal 437 is provided to frequency control register 604.

In contrast to phase controller 440, during normal operations, frequency controller 442 changes the contents of frequency control register 604 once per RTS sample, loading successive update signals 437 into frequency control register 604. This frequency value is then provided to clock generator 408 as frequency control value 435. This arrangement is essentially passing update signal 437 through frequency controller 442 and providing it to NCO 436 as frequency control signal 435.

However, like phase controller 440, a selected adjusted frequency control value 622 is only provided to frequency control register 604 when an impending dataflow error is anticipated. When either a data underflow or overflow condition arises, setting the appropriate data FIFO marker active, AFOAE signal 441 is also set active by OR gate 432, causing selector 624 to present selected adjusted frequency control value 622 to frequency control register 604.

Similar to selector 520 of phase controller 440, selector 620 is controlled by almost fill marker 415 and operates in the same manner as selector 520, increasing or decreasing the current frequency control value by frequency bump value 610. Frequency bump value 610 is determined by frequency adjuster 602 based upon a number of factors, including the worst anticipated frequency mismatch, and the time to recover. However, because the adjustment made by frequency controller 442 is effective only until the next update signal 437 is generated, frequency controller 442 is utilized to make short term corrections to the transmit clock frequency.

Thus, adaptifier 406 has no effect until an error condition seems imminent. When an error is forecast, the adaptifier briefly assumes control over the SRTS clock recovery subsystem 404 and prevents the error from taking place. Once the threat has ended, control is gracefully returned to the SRTS clock recovery subsystem, and transmit clock 423 will not experience further perturbation, such as wander. In addition, no SRTS information is lost during a brief span of adaptifier action. This ensures that there is no phase error generated by the adaptifier action which otherwise would accumulate and eventually cause line errors. To extend this phase protection to long spans of adaptifier action, the adaptifier may be advantageously combined with the RTS Sample Extender described in commonly-assigned U.S. patent application entitled "An Improved SRTS Clock Recovery System For Use in a Highly Stressed Network Environment", U.S. Ser. No. 08/573,297, naming as inventors Gary S. Muntz and Stanley A. Lackey, Jr., and filed concurrently herewith, is hereby incorporated by reference in its entirety.

Adaptifier 406 can effect a short term change via frequency controller 442, wherein the transmit clock frequency is slowed or accelerated by clock generator NCO 436 to allow data FIFO 412 to fill-up or drain. During this period, frequency controller 442 does not utilize update signal 437, effectively discarding the results of the low pass filter 434 and subtractor 426. Thus, if it is desired, these functions may not performed during this period.

It is anticipated that having a phase bump value 510 of 1 and a frequency bump value 610 of 0 will prevent data flow errors in most network systems. However, as one skilled in the relevant art would find apparent, phase adjuster 502 and frequency adjuster 602 may set the respective bump values based on the above and other relevant factors. Note that a frequency bump value if zero implies that frequency controller 442 may be deleted in such a system. In this case, update signal 437 is connected directly to frequency control signal 435. A non-zero frequency control value will potentially improve system performance, however. In particular, it will likely reduce minimum system delay by allowing the data FIFO markers to be placed closer to the underflow and overflow points of the data FIFO.

In the preferred embodiment of the present invention, the adaptifier is implemented primarily in software. However, it is considered to be apparent to those skilled in the art that the adaptifier may be implemented in digital, analog, or a combination of digital and analog elements.

Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A clock recovery system for ensuring proper reception and transmission of an information stream transmitted by a source node over a network having a network reference clock, the information stream including data to be transmitted to a destination user process at a transmit clock frequency, and a residual time stamp (RTS) representing a phase difference between a source node clock and a reference clock, wherein the data is stored in a data FIFO having a data FIFO level, an adaptifier for adjusting the transmit clock phase and frequency to prevent dataflow errors, the adaptifier comprising:

phase control means for determining a target phase offset utilized by an SRTS clock recovery subsystem to determine a phase error, said phase error utilized by a clock generator to determine the transmit clock phase; and frequency control means for adjusting a frequency control value for use by said clock generator to determine the transmit clock frequency, wherein said phase control means effects a permanent change in said transmit clock phase and said frequency control means effects a temporary change in said transmit clock frequency when a dataflow error is anticipated.

2. The adaptifier of claim 1, wherein said phase control means comprises:

phase adjustment means for generating a first adjusted target phase value; and update means, responsive to the data FIFO level, for providing said first adjusted target phase value to said SRTS clock recovery subsystem to prevent said anticipated dataflow error.

3. The adaptifier of claim 2, wherein said update means comprises:

storage means, coupled to said phase adjustment means, for storing said first adjusted target phase value.

4. The adaptifier of claim 2, wherein said phase adjustment means generates one or more adjusted target phase values based upon a type of said anticipated dataflow error, said one or more adjusted target phase values including said first adjusted target phase value, and wherein said phase adjustment means further comprises:

selecting means for selecting said first adjusted phase value from said one or more adjusted target phase values.

5. The adaptifier of claim 4, wherein said selecting means is responsive to the data FIFO level.

6. The adaptifier of claim 5, wherein the data FIFO level is represented by one or more data level markers generated by the data FIFO.

7. The adaptifier of claim 2, wherein said update means is responsive to one or more data level markers, said one or more data level markers comprising:

an almost empty marker indicating when the data FIFO is substantially empty; and an almost full marker indicating when the data FIFO is substantially full.

8. The adaptifier of claim 1, wherein said frequency control means comprises:

frequency adjustment means for generating a first adjusted frequency control value; and update means, responsive to the data FIFO level, for providing said first adjusted frequency control value to said clock generator to prevent said anticipated dataflow error.

9. The adaptifier of claim 8, wherein said update means comprises:

storage means for storing said frequency control value.

10. The adaptifier of claim 8, wherein said frequency adjustment means generates one or more adjusted frequency control values including said first frequency control value, and wherein said frequency adjustment means further comprises:

selecting means for selecting said first adjusted frequency control value from said one or more adjusted frequency control values.

11. The adaptifier of claim 10, wherein said selecting means is responsive to the data FIFO level.

12. The adaptifier of claim 11, wherein the data FIFO level is represented by one or more data level markers generated by the data FIFO.

13. A clock recovery system for ensuring proper reception and transmission of an information stream transmitted by a source node over a network having a network reference clock, the information stream including data to be transmitted to a destination user process at a transmit clock frequency and a residual time stamp (RTS) sample representing a phase difference between a source node clock and the reference clock, the clock recovery system comprising:

a data FIFO configured to store the data and generate a data FIFO level indicating a level of the stored data;

an SRTS clock recovery subsystem configured to generate a phase error representing a difference between a target phase offset and a current phase offset, said current phase offset having a value equal to a difference between a transmit clock phase and a source clock phase; and an adaptifier coupled between said data FIFO and said SRTS clock recovery subsystem said adaptifier generating said target phase offset in response to said data FIFO level and further controlling a clock generator in response to said phase error to thereby prevent dataflow errors.

14. The clock recovery system of claim 13, wherein said adaptifier comprises:
   a phase controller configured to permanently adjust a target phase utilized by said SRTS clock recovery subsystem to determine said phase error, thereby permanently adjusting said transmit clock phase.

15. The clock recovery system of claim 14, wherein said phase controller comprises:
   a phase adjuster for generating one or more adjusted target phase values;
   a selector for selecting one of said one or more adjusted target phase values based upon said data FIFO level; and
   update means for providing said selected adjusted target phase value to said SRTS clock recovery subsystem when said data FIFO level indicates that a dataflow error may occur.

16. The clock recovery system of claim 15, wherein said data FIFO level is provided by one or more data level markers, said one or more data level markers comprising:
   an almost empty marker indicating when said data FIFO is substantially empty; and
   an almost full marker indicating when said data FIFO is substantially full.

17. The clock recovery system of claim 13, wherein said adaptifier comprises:
   a frequency controller configured to temporarily adjust said transmit clock frequency to prevent said dataflow errors.

18. The clock recovery system of claim 17, wherein said clock generator comprises:
   means, responsive to said phase error, for generating said transmit clock having said frequency and said phase, and for transmitting the data to the destination user process at said transmit clock frequency.

19. The clock recovery system of claim 18, wherein said frequency controller comprises:
   frequency adjustment means for generating an adjusted frequency control value; and
   update means for providing said adjusted frequency control value to said clock generator when an error condition is anticipated.

20. The clock recovery system of claim 19, wherein said frequency adjustment means and said update means are responsive to said data FIFO level.

21. The clock recovery system of claim 13, further comprising:
   a network receiver configured to receive the information stream, said network receiver including:
      a cell/packet receiver configured to parse the information stream into a plurality of portions, said plurality of portions comprising a first portion including the data and a second portion including said RTS sample;
      said data FIFO; and
      an RTS sample FIFO for storing said RTS sample,
   wherein said SRTS clock recovery subsystem retrieves said RTS sample from said RTS sample FIFO, and further wherein said clock generator retrieves the data from said data FIFO for transmission to the destination user process.

22. A clock recovery system for ensuring proper reception and transmission of an information stream transmitted by a source node over a network having a network reference clock, the information stream including data to be transmitted to a destination user process at a transmit clock frequency and a residual time stamp (RTS) representing a phase difference between a source node clock and the reference clock, the clock recovery system comprising:
   a data FIFO configured to store the data;
   an SRTS clock recovery subsystem configured to generate a phase error representing a difference between a target phase offset and a current phase offset, said current phase offset having a value equal to a difference between a transmit clock phase and a source clock phase;
   a clock generator, responsive to said phase error, for generating a transmit clock having said frequency and said phase, and for transmitting the stored data to the destination user process at said transmit clock frequency; and
   an adaptifier for controlling said clock generator to prevent dataflow errors, said adaptifier including:
      a phase controller configured to permanently adjust said target phase offset utilized by said SRTS clock recovery subsystem to determine said phase error, thereby permanently adjusting said transmit clock phase, and
      a frequency controller configured to temporarily adjust said transmit clock frequency to prevent said dataflow errors.

23. The adaptifier of claim 8, wherein the data FIFO level is represented by one or more data level markers, said one or more data level markers comprising:
   an almost empty marker indicating when the data FIFO is substantially empty; and
   an almost full marker indicating when the data FIFO is substantially full.

* * * * *